(12) United States Patent
Pijlman et al.

(10) Patent No.: US 8,570,645 B2
(45) Date of Patent: Oct. 29, 2013

(54) BEAM STEERING DEVICE (75) Inventors: Fetze Pijlman, Eindhoven (NL);
Marcellinus Petrus Carolus Michael Krijn, Eindhoven (NL); Michel Cornelis Josephus Marie Vissenberg, Roermond (NL); Lieven Raf Roger Desmet, Eindhoven (NL); Baptiste Fleury Louis Delplanque, Eindhoven (NL); Tim Dekker, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/501,117

(22) PCT Filed: Sep. 30, 2010

(86) PCT No.: PCT/IB2010/054410
§ 371 (c)(1),
(2), (4) Date: Apr. 10, 2012

(87) PCT Pub. No.: WO2011/051841
PCT Pub. Date: May 5, 2011

(65) Prior Publication Data
US 2012/0206791 A1 Aug. 16, 2012

(30) Foreign Application Priority Data
Oct. 30, 2009 (EP) .................................... 09174568

(51) Int. Cl.
G02F 1/29 (2006.01)
G02F 1/03 (2006.01)
G02F 1/07 (2006.01)
G02B 26/08 (2006.01)

(52) U.S. Cl.
USPC ............................ 359/315; 359/304; 359/256

(58) Field of Classification Search
USPC ................. 359/237–239, 245–246, 262, 279, 359/290–292, 298, 315–316, 321–322, 359/489.01, 489.08, 489.09, 489.1, 489.11, 359/489.12, 489.13, 489.15, 489.16
See application file for complete search history.

(56) References Cited

U.S. PATENT DOCUMENTS 5,151,814 A 9/1992 Grinberg et al.
5,253,033 A 10/1993 Lipchak et al.
(Continued)

FOREIGN PATENT DOCUMENTS

EP 1542055 A2 6/2005

OTHER PUBLICATIONS

George Farca et al; "An Analog, Non-Mechanical Beam-Steerer With an 80 Degree Field of Regard for Lidar Applications", The 2008 International Lidar Mapping Forum, Denver, CO, Feb. 21-22, Vescent Photonics Inc., Proc of SPIE., vol. 6971, 69710G-6.

(Continued)

Primary Examiner — Thomas K Pham
Assistant Examiner — Brandi Thomas
(74) Attorney, Agent, or Firm — Mark L. Beloborodov (57) ABSTRACT A beam steering device (300) for deflecting a beam of light is provided. The beam steering device comprises a first deflecting member (310), a rotating member (320), and a second deflecting member (330). For an incoming beam of light having components (303, 302) with their polarization parallel (303') and perpendicular (302'), respectively, to an optic axis (314, 334) of the beam steering device, the parallel component (303) is deflected by a first angle (304) when passing the first deflecting member. When passing the rotating member, the polarization (303', 302') of the beam of light is rotated by 90 degrees (303", 302"). When passing the second deflecting member, the perpendicular component (302) is deflected by a second angle (305).

14 Claims, 6 Drawing Sheets

(56) References Cited

U.S. PATENT DOCUMENTS

| | | |
|---|---|---|
| 7,146,070 B1 | 12/2006 | Li et al. |
| 7,408,601 B1 | 8/2008 | Huang et al. |
| 2008/0198431 A1* | 8/2008 | Schwerdtner .................. 359/32 |
| 2008/0219663 A1 | 9/2008 | Yuan et al. |
| 2009/0015937 A1 | 1/2009 | Feldman |

OTHER PUBLICATIONS

Paul McManamon; "Putting on the Shift" Air Force Research Lab., Apr. 2003 SPIE's Osmagazine, pp. 15-17.

Steven Serati et al; "Advanced Liquid Crystal on Silicon Opticasl Phased Arrays", 2004 IEEE Aerospace Conf. Proc. (IEEE Cat. No. 04TH8720), pp. 1396-1402.

A.F. Fray et al; "Large-Angle Beam Deflector Using Liquid Crystals", Electronics Letters, Aug. 7, 1975, vol. 11, No. 16, pp. 358-359.

Boris Apter et al; "On the Fringing-Field Effect in Liquid-Crystal Beam-Steering Devices", Applied Optics, Jan. 1, 2004, vol. 43, No. 1, pp. 11-19.

Paul F. McManamon et al; "Optical Phased Array Technology", Proceedings of the IEEE, vol. 84, No. 2, Feb. 1996.

* cited by examiner

BEAM STEERING DEVICE

FIELD OF THE INVENTION

The invention relates to devices for electrically steering a beam of light.

BACKGROUND OF THE INVENTION

Beam steering devices are used in lighting appliances for controlling the direction of a beam of light. This can, e.g., be done in a semi-static way, for changing the atmosphere of a room from time to time, or dynamically, for entertainment purposes. In combination with a tracking mechanism, beam steering can also be used for illuminating a moving object.

Previous beam steering technologies were based on mechanical devices such as motor actuated mirrors or lenses. Also known are beam steering devices utilizing electrically controllable liquid crystal based phased arrays or waveguides.

U.S. Pat. No. 5,151,814 discloses an optical beam scanner incorporating an array of liquid crystal based beam deflection elements. The deflection of the beam is accomplished by setting the phase tilt and the phase offset.

SUMMARY OF THE INVENTION

It is an object of the present invention to provide a more efficient alternative to the above techniques and prior art.

More specifically, it is an object of the present invention to provide an improved beam steering device that is electrically controllable.

These and other objects of the present invention are achieved by means of a beam steering device having the features defined in independent claim 1. Embodiments of the invention are characterized by the dependent claims.

For the purpose of describing the present invention, a birefringent material is an optically anisotropic material, i.e., a material in which the effect the material has on a ray of light propagating in the material is dependent on the direction of propagation, the optic orientation of the material, and the polarization of the light.

An uniaxial material is a special case of a birefringent material. The effect of a uniaxial material on a ray of light can be described by an optic axis. Light rays with a polarization perpendicular to the optic axis experience an ordinary index of refraction. Light rays with a polarization parallel to the optic axis experience an extraordinary index of refraction. Light rays having a polarization other than purely perpendicular or parallel to the optic axis experience a refractive index in-between the ordinary index of refraction and the extraordinary index of refraction.

According to an aspect of the present invention, a device for deflecting a beam of light is provided. The device comprises a first deflecting member for deflecting a fraction of the beam of light by a first angle. The first deflecting member comprises a first prism. The first prism comprises a first optical member and a second optical member. The first optical member gives rise to a first index of refraction. The second optical member is birefringent and has an electrically controllable optic axis. The optic axis gives rise to a second index of refraction. The fraction of the beam of light which is deflected by the first deflecting member has a linear polarization such that the first angle of deflection is proportional to the difference between the first index of refraction and the second index of refraction.

The present invention makes use of an understanding that a prism comprising two optical members, of which at least one is birefringent and has a variable index of refraction, can be used to deflect a beam of light in a controlled manner. By electrically controlling the optic axis, and, in turn, the index of refraction, a beam of light passing through the prism can be deflected. The optic axis may be controlled by a combination of alignment layers on surfaces facing the prism, e.g., rubbed poly-imide layers, and applying an electric field over the prism. Depending on the electric field strength, the optic axis changes orientation. The deflection is caused by refraction at the interface between the first and the second optical member of the prism. A beam steering device according to an embodiment of the invention is advantageous in that is does not require any movable parts, which makes it robust, silent, and fast. Common problems inherent to known beam steering devices employing movable parts, such as a limited acceleration, vibrations, limited life time and rather large space requirements, can be avoided or at least mitigated.

According to an embodiment of the invention, the device further comprises a second deflecting member, for deflecting a fraction of the beam of light by a second angle, and a rotating member. The rotating member is located between the first deflecting member and the second deflecting member. The second deflecting member comprises a second prism. The second prism comprises a first optical member and a second optical member. The first optical member gives rise to a first index of refraction. The second optical member is birefringent and has an electrically controllable optic axis. The optic axis gives rise to a second index of refraction. The fraction of the beam of light which is deflected by the second deflecting member has a linear polarization such that the second angle of deflection is proportional to the difference between the first index of refraction and the second index of refraction. The rotating member has at least a first state. The rotating member is configured, when in its first state, for rotating the polarization of the beam of light by 90 degrees. This is advantageous in that both polarization components of a beam of light can be deflected. First, the fraction of a beam of light having a polarization parallel to the optic axis of the first prism is deflected. Then, the polarization of the beam of light is rotated by 90 degrees when passing the rotating member. The effect of this rotation is that the two polarization components are interchanged, i.e., the deflected component, which originally had a polarization parallel to the optic axis to the first prism, now has a polarization perpendicular to the optic axis of the first prism, and also to the optic axis of the second prism as the two prisms have, in fact, the same optic orientation. Finally, the component of the beam of light with a polarization parallel to the optic axis of the second prism, which was not deflected by the first deflecting member, is deflected by a second angle when passing the second deflecting member. Thus, both polarization components of the beam of light are deflected. The first angle and the second may be controlled independently of each other. If the first angle and the second angle are different, the different polarization components are split, i.e., the beam steering device acts as a beam splitter.

According to an embodiment of the invention, the first prism and the second prism are micro prisms. Using a plurality of micro prisms has the advantage that the size of the device can be reduced, at least in one dimension.

According to an embodiment of the invention, the optic axis of the second optical member of the first prism and the optic axis of the second optical member of the second prism are jointly electrically controllable such that the first angle and the second angle are substantially equal. This is advantageous in that both polarization components are deflected by the same angle and continue to propagate as a single beam after passing the beam steering device.

According to an embodiment of the invention, the first optical member of the first prism and the first optical member of the second prism are polymer based. Using polymer is advantageous since it can be molded. In particular, if an assembly of micro prisms is used, such a prism structure can be molded into a polymer film. In that way a deflecting member can be fabricated which is thin, only a few millimeters thick, while the lateral dimensions can be made much larger.

According to an embodiment of the invention, the second optical member of the first prism and the second optical member of the second prism are liquid crystal based.

According to an embodiment of the invention, the rotating member further has a second state. The rotating member is configured, when in its second state, to leave the polarization of the beam of light substantially unaffected. The rotating member is electrically switchable between its first and its second state. This is advantageous in that the rotation of the polarization of the beam of light, i.e., the interchanging of the two polarization components, can be activated or not. In that way a beam steering device according to an embodiment of the invention may be used in at least to different modes. In the first mode, with the rotating member activated, both polarization components of the beam of light are deflected, i.e., the beam is deflected as a whole. In the second mode, with the rotating member not activated, only the component that has a polarization parallel to the optical axes of the first and the second prism is deflected. Since both deflecting members in this case deflect the same polarization component, a larger angle of deflection can be obtained. This can be utilized, e.g., for deflecting a polarized beam of light, such as light emitted by a laser.

According to an embodiment of the invention, the rotating member is based on liquid crystals, e.g., nematic liquid crystals.

According to an embodiment of the invention, a device comprises a plurality of beam steering devices. The plurality of beam steering devices are arranged as pixels in a matrix. The pixels are individually controllable. This is advantageous since multiple beams can be deflected into different directions. In particular, multiple beams can be obtained from a single light source. A matrix of beam steering devices can be used for beam shaping and for producing light patterns.

According to an embodiment of the invention, the device further comprises a telescope for magnifying the beam deflection. Using a telescope is advantageous since the maximum angle of deflection of a given beam steering device can be increased. The telescope may also comprise reflective parts.

According to another embodiment of the invention, the device further comprises an array of telescopes for magnifying the beam deflection.

According to an embodiment of the invention, the telescope comprises a first lens and a second lens. The first lens has focal length $f_1$. The second lens has focal length $f_2$. The focal lengths are such that $f_1 > f_2$. The distance between the first lens and the second lens is $f_1 + f_2$.

According to another embodiment of the invention, the telescope comprises a first plurality of lenses and a second plurality of lenses. The first lenses have focal length $f_1$ and diameter $D_1$ and are arranged in a matrix. The second lenses have focal length $f_2$ and diameter $D_2$ and are arranged in a matrix. The focal lengths are such that $f_1 > f_2$ and the distance between the first plurality of lenses and the second plurality of lenses is $f_1 + f_2$. Using a matrix of lenses, e.g., micro lenses, is advantageous since lenses of smaller diameter typically have shorter focal lengths, resulting in a telescope of smaller extension along the direction of light propagation.

According to yet another embodiment of the invention, the telescope further comprises a third plurality of lenses. The third lenses have focal length $f_3$ and diameter $D_3$ and are arranged in a matrix and located between the first plurality of lenses and the second plurality of lenses. The third plurality of lenses are arranged at distance $f_1$ from the first plurality of lenses and at distance $f_2$ from the second plurality of lenses. The focal lengths are such that $1/f_3 = 1/f_1 + 1/f_2$. Using a third array of lenses is advantageous in that the angle of acceptance, i.e., the maximum angle incident light may have with respect to an optic axis of the telescope, can be increased. Further, the focal lengths of the second and third lenses can be reduced by reducing the respective lenses' diameter.

According to an embodiment of the invention, the beam steering device further comprises a light source. Preferably, the light source emits a collimated beam of light.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
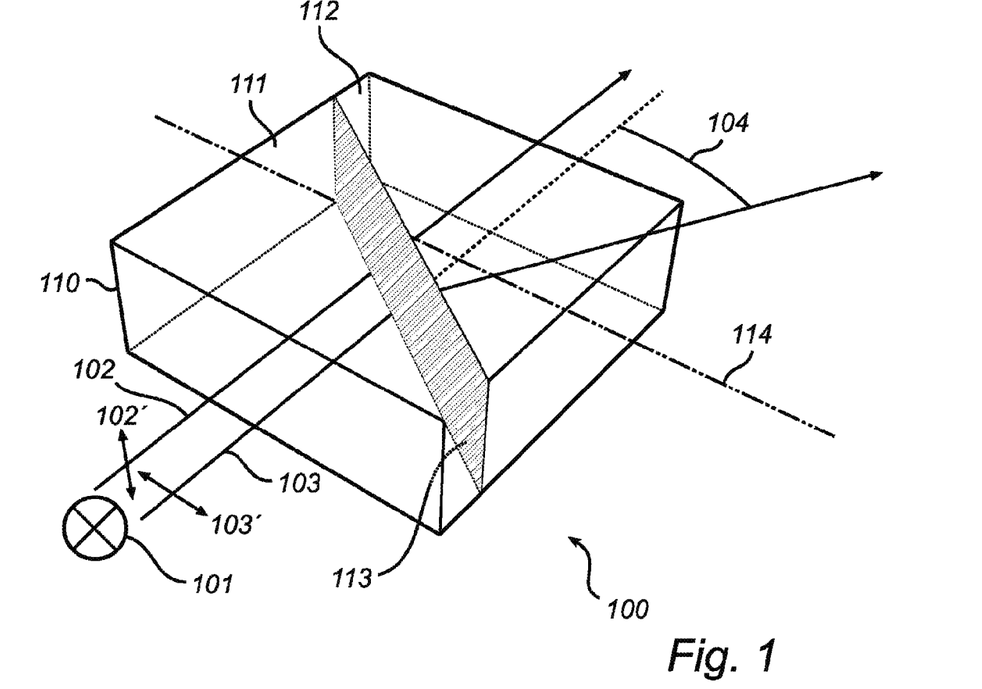
FIG. 1 shows a beam steering device in accordance with an embodiment of the invention.

FIG. 1 shows a beam steering device 100 in accordance with an embodiment of the invention. The beam steering device 100 comprises a deflecting member 110. The deflecting member 110 constitutes a prism comprising two optical members 111 and 112 which make up an internal interface 113 of the prism. The first optical member 111 is optically isotropic and can be characterized by an isotropic index of refraction. The second optical member 112 is a birefringent material having a uniaxial anisotropy, i.e., a single axis of anisotropy 114, also referred to as the optic axis 114. Such a material can be characterized by an ordinary index of refraction, affecting the ordinary ray having a polarization perpendicular to the optic axis 114, and an extraordinary index of refraction, affecting the extraordinary ray having a polarization parallel to the optic axis 114. The orientation of the optic axis 114 may be controlled by applying an electric field over the prism 110 and by alignment layers, e.g., rubbed polyimide layers. By changing the orientation of the optic axis 114, the index of refraction can be varied.

Even though the optic axis 114 has been illustrated in FIG. 1 having a specific orientation, other orientations of the optic axis may be realized, e.g., by using an alignment layer. In case of micro prisms, e.g., an orientation of the optic axis along the edge of the prisms may be easier to accomplish. In the following, embodiments of the invention will be described assuming the orientation of the optic axis 114 as illustrated in FIG. 1. However, the invention is not limited to that specific orientation.

Incident light, originating, e.g., from a light source 101, that is passing through the first deflecting member 110 can be decomposed into two polarization components having polarizations perpendicular and parallel, respectively, to the optic axis 114 of the prism. For the purpose of describing the invention, the incident light is illustrated as two separate rays 102 and 103 having perpendicular 102' and parallel 103' polarization, respectively.

Ray 102, having a polarization 102' perpendicular to the optic axis 114, passes through the deflecting member 110 without being deflected. Ray 103, having a polarization 103' parallel to the optic axis 114 of the prism, is deflected by a first angle 104 when passing the first deflecting member 110. The deflection is caused by refraction at the internal interface 113 due to a mismatch between the refractive index of the first optical member 111 and the extraordinary refractive index of the second optical member 112. The first angle 104 is proportional to the difference between the two refractive indices on either side of the interface 113.

With reference to FIG. 1, if the incident light is linearly polarized with a polarization 103' parallel to the optic axis 114, i.e., component 102 is negligible, the entire beam of light can be deflected. If, on the other hand, the incident light contains both polarization components 102 and 103, the first deflecting member 110 acts as a beam splitter, leaving component 102 unaffected while deflecting component 103 by an angle 104.

The first optical member 111 may be based on a polymer, which can be molded. The second optical member 112 may be based on a liquid crystal. In this case the optic axis 114 of the second member 112 can be varied by applying an electric field over the second member, at least over a volume close to the internal interface 113 and sufficiently large to effect the deflection, or the prism as a whole.

Typically, if a polymer is used for the first optical member 111 and a liquid crystal is used for the second optical member 112, the refractive index of the first optical member 111 and the ordinary refractive index of the second optical member 112 have a value about 1.5. The extraordinary index of refraction of the second optical member 112 is fixed, typically about 1.7, and independent of electric field. In other words, with the described combination of materials, a beam of light passing the beam steering device 100 will be deflected if no electric field is applied, and the angle of deflection may be reduced by applying an electric field. However, a different behavior, i.e., no deflection when no electric field is applied and deflection proportional to an applied electric field, can be achieved by a proper choice of materials for the first optical member 111 and the second optical member 112. The first optical member 111 can, e.g., be made of a birefringent material.

Figure 2:
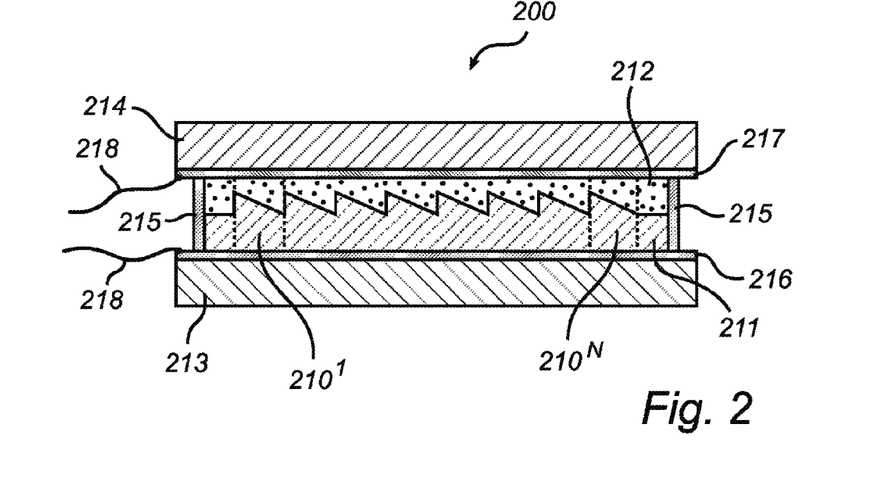
FIG. 2 shows a deflecting member in accordance with an embodiment of the invention.

Even though the first deflecting member 110 has been described, with reference to FIG. 1, as comprising one prism, a plurality of prisms may be used, such as an assembly of micro prisms. With reference to FIG. 2, a deflecting member 200, in accordance with an embodiment of the invention, comprising micro prisms $210^1$-$210^N$ is described. Even though a fixed number of prisms is in depicted in FIG. 2, any number of prisms suitable for the application at hand can be envisioned.

The micro prisms $210^1$-$210^N$ are made up by a one-dimensional prism structure 211 and a liquid crystal layer 212. For confining the liquid crystal 212, and for supporting the structure, the prisms $210^1$-$210^N$ are sandwiched between two glass plates 213 and 214 which are kept at a distance by spacers 215. For the purpose of applying an electric field over the prisms $210^1$-$210^N$, the glass plates 213 and 214 are coated with conducting layers 216 and 217, respectively, which are, preferably, optically transparent for the light that is passed through the deflecting member 200. The conducting layers 216 and 217 may, e.g., be made of indium tin oxide (ITO). Wires 218 may be used to connect the conducting layers 216 and 217 to a voltage source. The one-dimensional prism structure 211 may, e.g., be molded into a polymer film. Typically, the polymer film is about 100 µm thick, and the liquid crystal layer 212 has a thickness of about 50 µm. However, any thickness may be used that is adequate for the application at hand. By using standard replication technology, thin deflecting members of thicknesses about 1 mm and much larger lateral dimensions can be achieved.

Figure 3:
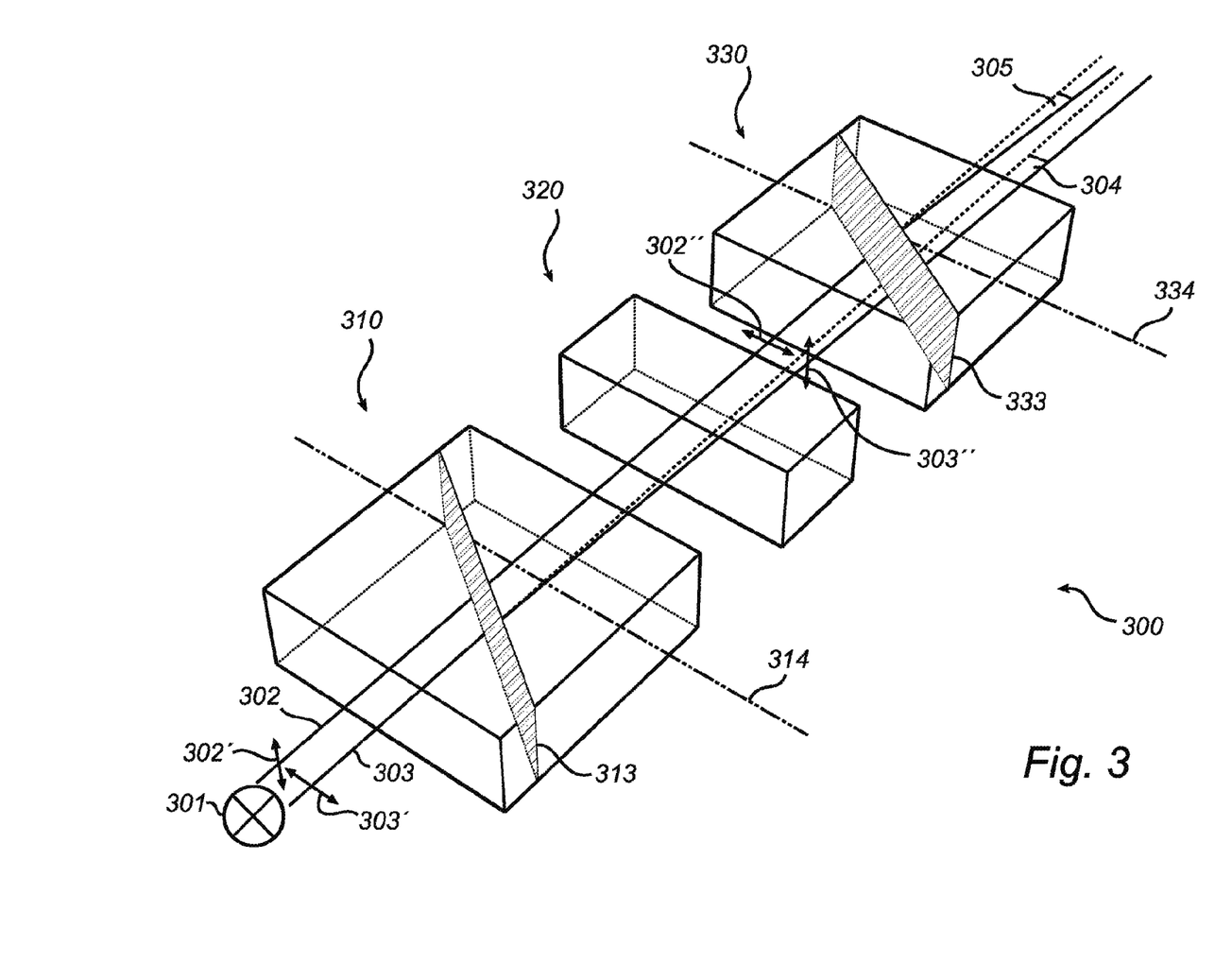
FIG. 3 shows a beam steering device in accordance with another embodiment of the invention.

With reference to FIG. 3, a beam steering device 300 according to another embodiment of the invention is described. The beam steering device 300 comprises two deflecting members 310 and 330 as well as a rotating member 320. The rotating member 320 is located between the first deflecting member 310 and the second deflecting member 330. The second optical member of the first prism 310 and the second optical member of the second prism 330 have the same optic orientation if no electric field is applied.

Incident light, emitted by a light source 301, that is passing through the beam steering device 300, i.e., the first deflecting member 310, the rotating member 320, and the second deflecting member 330, can be decomposed into two polarization components 302 and 303, in analogy to what was described with reference to FIG. 1. Ray 303, having a polarization 303' parallel to the optic axis 314, is deflected by a first angle 304 when passing the first deflecting member 310. When passing the rotating member 320, the polarization of ray 303 is rotated by 90 degrees such that the polarization is now perpendicular 303" to the optical axes 334. Therefore, when passing the second deflecting member 330, ray 303 is not deflected. Thus, considering the beam steering device 300 as a whole, ray 303 is deflected by the first angle 304 when passing the device 300.

The other polarization component of the incident light, i.e., ray 302 having a polarization perpendicular 302' to the optic axis 314, is not deflected when passing the first deflecting member 310. When passing the rotating member 320, the polarization of ray 302 is rotated by 90 degrees such that its parallel 302" to the optic axis 334 when entering the second deflecting member 330. Therefore, ray 302 is deflected by a second angle 305 when passing the second deflecting member 330. Thus, considering the beam steering device 300 as a whole, ray 302 is deflected by the second angle 305 when passing the device 300.

Considering incident light that is not linearly polarized with a polarization that is either parallel 303' or perpendicular 302' to the optic axis 314, but has a polarization that can be described as a combination of both components, the incident light can be deflected as a whole when passing the beam steering device 300 if the first angle 304 and the second angle 305 are chosen to be equal. If, on the other hand, the angles 304 and 305 are chosen to be different, the beam steering device 300 can be used as a beam splitter which allows to split incident light into two components having parallel 303' and perpendicular 302' polarization, respectively, with respect to the optic axis 314.

The deflecting members 310 and 330 of the beam steering device 300, described with reference to FIG. 3, may be of the same type as deflecting member 200 described with reference to FIG. 2. Deflecting members 310 and 330 may be identical or different. Having identical deflecting members 310 and 330 is advantageous if the incident beam of light is to be deflected as a whole, i.e., if the first angle 304 and the second angle 305 are equal. This can be achieved by applying the same electric field over the prisms in both deflecting members, i.e., by applying the same voltage to the conducting layers of both deflecting members.

Figure 4:
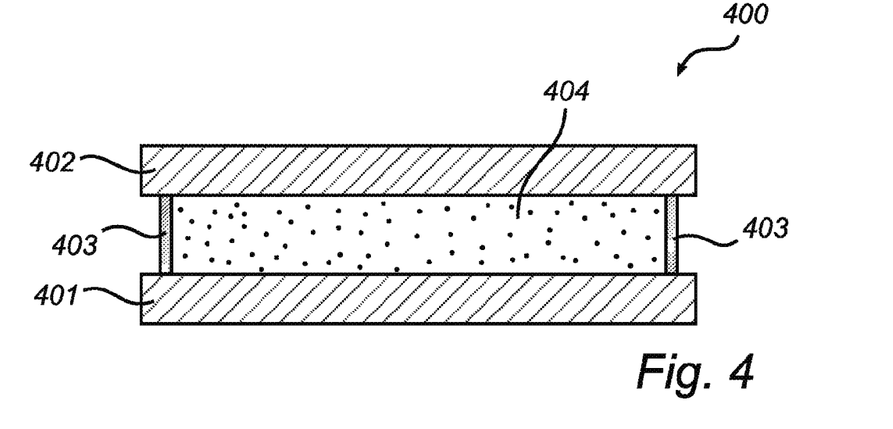
FIG. 4 shows a rotating member in accordance with an embodiment of the invention.

With reference to FIG. 4, rotating member 400 according to an embodiment of the invention is described. The rotating member 400 comprises two glass plates 401 and 402, separated by spacers 403. The volume between the glass plates 401 and 402 is filled with a twisted nematic liquid crystal 404. The alignment of the liquid crystal is achieved using a rubbed polyimide alignment layer covering the sides of the glass plates 401 and 402 facing the liquid crystal 404. The rubbed polyimide layers are arranged with their respective alignment perpendicular to each other such that the liquid crystal 404 is twisted, resulting in a rotation of the polarization of a beam of light passing through the rotating member 400 by 90 degrees.

Rotating member 400, described with reference to FIG. 4, may further be arranged with transparent conducting layers covering the glass plates facing the liquid crystal. In that way the rotating member 400 can be switched off, i.e., the polarization of a beam of light passing the rotating member 400 is unaffected, by applying an electric field over the liquid crystal 404. This can be achieved by applying an electric voltage to the conducting layers. The conducting layers can, e.g., be made of ITO. With reference to FIG. 3, if the rotating member is switched off, only the polarization component 303 of a beam of light having its polarization 303' parallel to the optic axis 314 is deflected, while the other component 302 is unaffected. A beam steering device 300 with an electrically switchable rotating member is advantageous if a linearly polarized beam of light, having a polarization parallel 303' to optic axis 314, is to be deflected, since the maximum angle of deflection is increased. Optionally, such a device may be used as a beam splitter.

Figure 5:
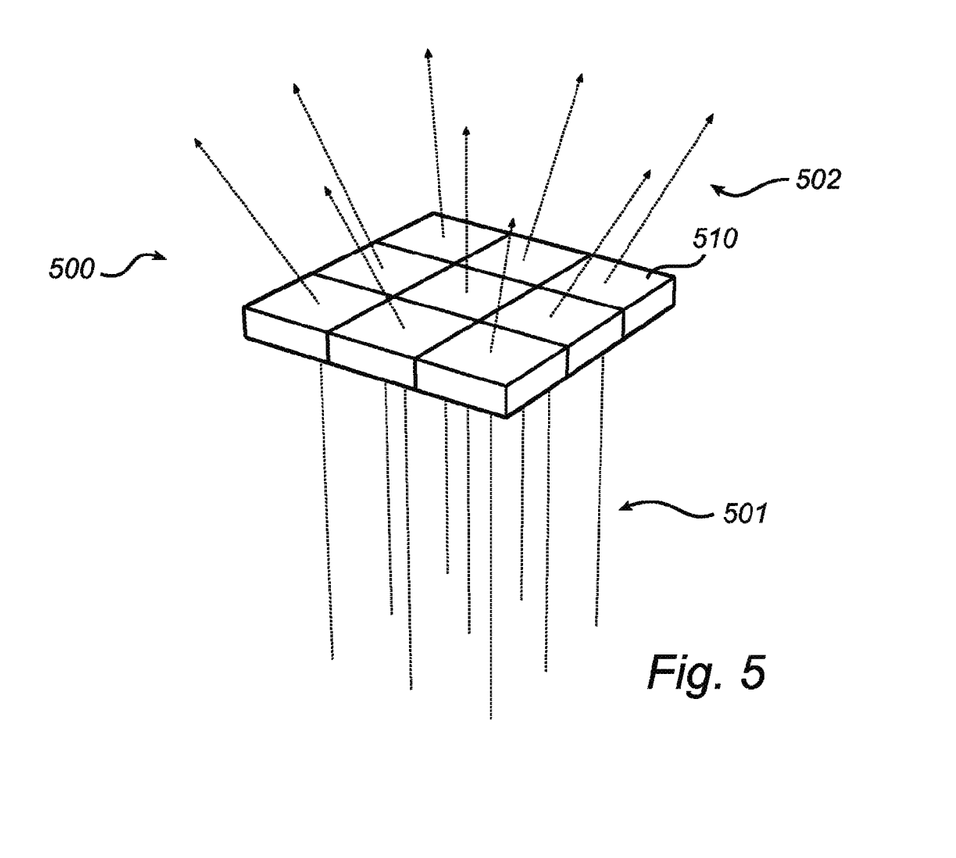
FIG. 5 shows a beam steering device in accordance with a further embodiment of the invention.

In FIG. 5, a beam steering device 500 in accordance with another embodiment of the invention is shown. Beam steering device 500 comprises a plurality of pixels 510 for individually deflecting a plurality of beams 502. The incident light 501 may originate from a single light source, in which case the light is split into several beams, or from a plurality of light sources.

Figure 6:
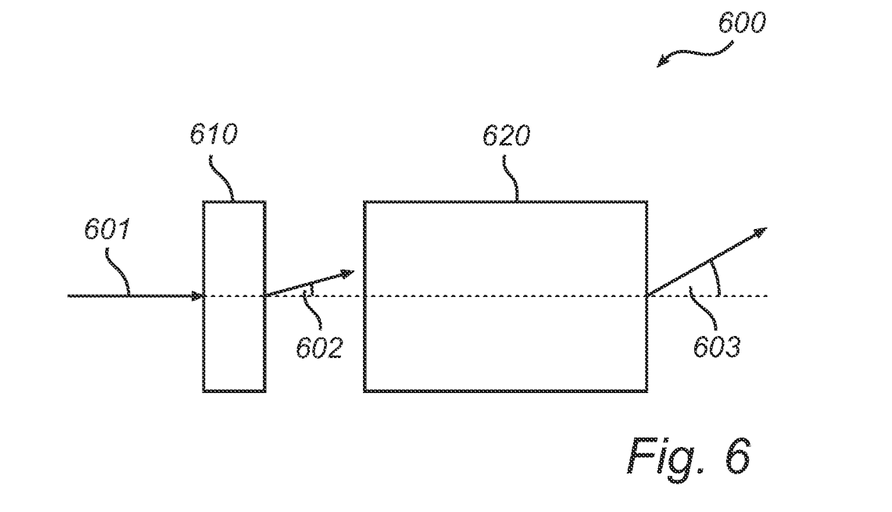
FIG. 6 shows a beam steering device with yet another embodiment of the invention.

With reference to FIG. 6, a beam steering device 600 in accordance with a further embodiment of the invention is described. Beam steering device 600 comprises a deflecting member 610 and a telescope 620. The deflecting member 610 may be single deflecting member, such as deflecting member 110 described with reference to FIG. 1, or a stack of two deflecting members 310 and 330 and a rotating member 320, as described with reference to FIG. 3. With reference to FIG. 6, an incident beam of light 601 is deflected by an angle 602 when passing deflecting member 610. The deflection of the beam is magnified after passing telescope 620, the angle of deflection now being 603. In other words, the incident beam of light is deflected by an angle 603 when passing through the beam steering device 600 as a whole, i.e., both deflecting member 610 and telescope 620.

Figure 7A:
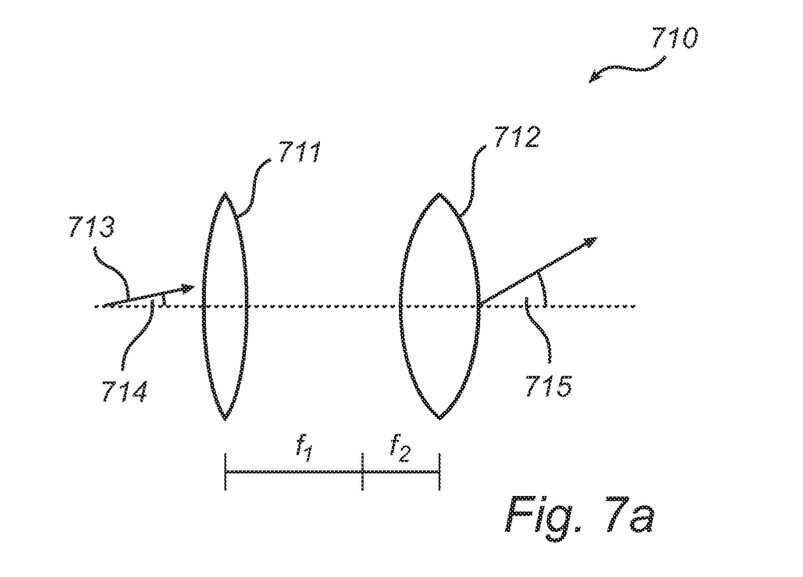
FIGS. 7a-d show telescopes in accordance with embodiments of the invention.

In FIGS. 7a-d, telescopes according to embodiments of the invention are shown. FIG. 7a shows a telescope 710 comprising two lenses 711 and 712 having focal lengths $f_1$ and $f_2$, respectively. The lenses 711 and 712 are arranged with a distance $f_1+f_2$ apart. If $f_1$ and $f_2$ are chosen such that $f_1 > f_2$, an incident beam of light 713 having an angle of incidence 714 will have its deflection increased to an angle 715 when passing through the telescope.

Figure 7B:
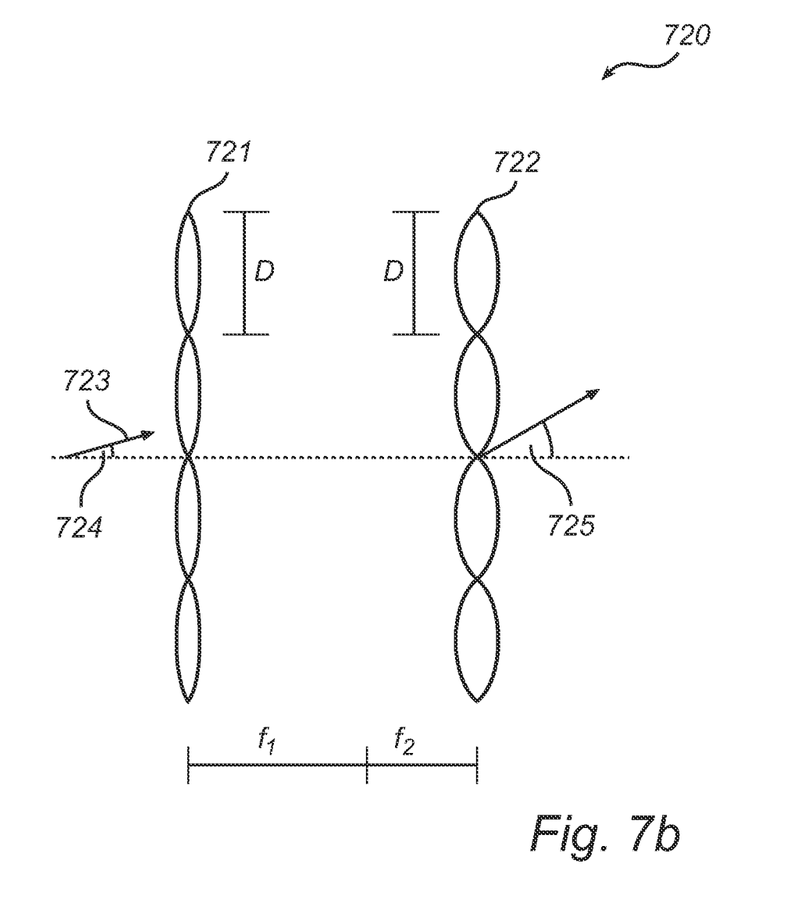

For the purpose of reducing to the focal lengths $f_1$ and $f_2$, resulting in a smaller telescope, a matrix of lenses may be used. FIG. 7b shows a telescope 720 comprising two matrices 721 and 722 of lenses having focal lengths $f_1$ and $f_2$, respectively, and diameter D. Preferably, in order to avoid undesirable secondary beams, such a system is designed such that light entering a lens of the first matrix 721 will only pass the corresponding lens of the second matrix 722. This condition is complied with if the following expression for the acceptance angle $\alpha_{max}$, the maximum angle that an incident beam of light may have, is fulfilled:

$$\tan \alpha_{max} < \frac{D}{2f_2} \frac{1}{M} \frac{M-1}{M+1},$$

where $M=f_1/f_2$.

Figure 7C:
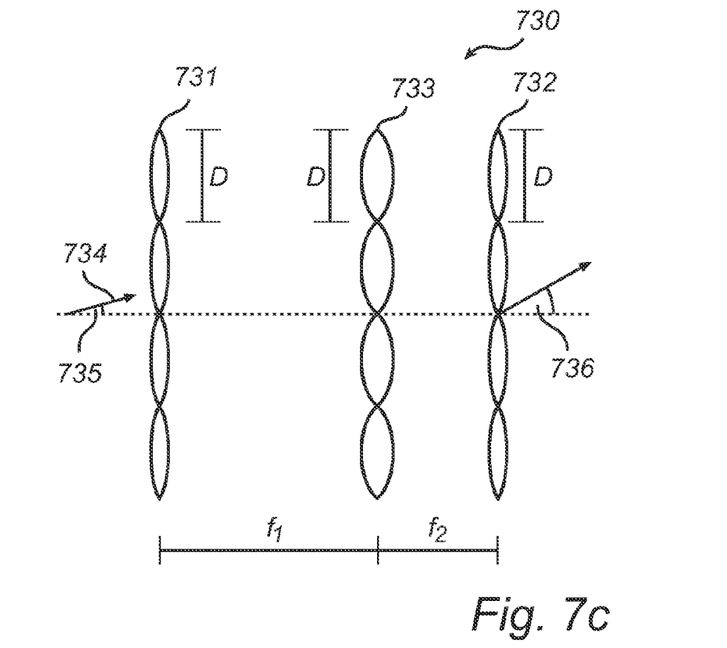

FIG. 7c shows a telescope 730 according to a further embodiment of the invention, the telescope 730 comprising two matrices of lenses 731 and 732, having focal lengths $f_1$ and $f_2$ and diameter D, and a further matrix of lenses 733 having focal length $f_3$ and diameter D. The matrix of lenses 733 is arranged at distance $f_1$ from the matrix of lenses 731 and at $f_2$ from the matrix of lenses 732. In addition, each lens is designed such that a point of a lens of the matrix of lenses 731 is imaged on the corresponding lens of the matrix of lenses 732. In such a telescope, if the focal length $f_3$ is given by $1/f_3=1/f_1+1/f_2$, the acceptance angle $\alpha_{max}$ is found to be improved and given by:

$$\tan \alpha_{max} < \frac{D}{2f_1}.$$

Figure 7D:
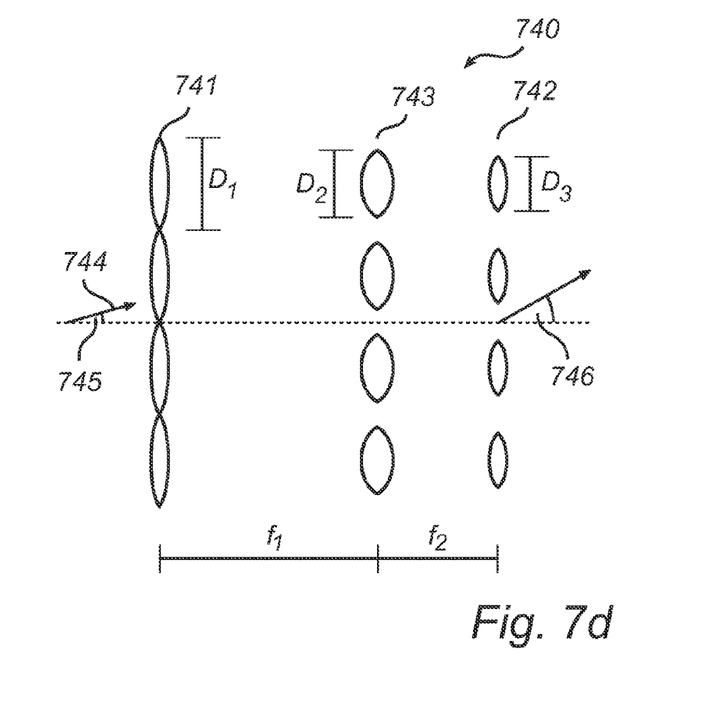

FIG. 7d shows a telescope 740 according to yet another embodiment of the invention. Telescope 740 comprises three matrices of lenses, similar to telescope 730 described with reference to FIG. 7c. However, in telescope 740 the matrices of lenses 741, 742, and 743, comprise lenses of different diameter $D_1$, $D_2$, and $D_3$, respectively. By reducing the diameters of the lenses of matrices 742 and 743, and such that the relation $D_2/f_2 > D_1/f_1$ holds, an improved angle of acceptance $\alpha_{max}$ can be achieved:

$$\tan \alpha_{max} < \frac{D_3}{2f_1}.$$

The person skilled in the art realizes that the present invention by no means is limited to the embodiments described above. On the contrary, many modifications and variations are possible within the scope of the appended claims. For example, the first optical member of a prism may be birefringent as well. Further, two deflecting members, or two stacks of two deflecting members and a rotating member, may be combined to allow for deflecting a beam of light into two directions. Further, cylindrical lenses may be used for magnifying the deflection of a beam of light in one direction.

In conclusion, a beam steering device for deflecting a beam of light is provided. The beam steering device comprises a first deflecting member, a rotating member, and a second deflecting member. For an incoming beam of light having components with their polarization parallel and perpendicular, respectively, to an optic axis of the beam steering device, the parallel component is deflected by a first angle when passing the first deflecting member. When passing the rotating member, the polarization of the beam of light is rotated by 90 degrees. When passing the second deflecting member, the perpendicular component is deflected by a second angle.

The invention claimed is:

1. A device for deflecting a beam of light, said device comprising:
   a first deflecting member for deflecting a fraction of the beam of light by a first angle, said first deflecting member comprising a first prism comprising:
      a first optical member giving rise to a first index of refraction, and
      a second birefringent optical member having an electrically controllable optic axis giving rise to a second index of refraction, the fraction of the beam of light having a linear polarization such that said first angle is proportional to the difference between said first index of refraction and said second index of refraction,
   a second deflecting member for deflecting a fraction of the beam of light by a second angle, said second deflecting member comprising a second prism comprising:
      a third optical member giving rise to a fifth index of refraction, and
      a fourth birefringent optical member having an electrically controllable optic axis giving rise to a sixth index of refraction, the fraction of the beam of light having a linear polarization parallel such that said second angle is proportional to the difference between said fifth index of refraction and said sixth index of refraction, and
   a rotating member having at least a first state, said rotating member being configured, when in its first state, for rotating the polarization of the beam of light by 90 degrees, said rotating member being located between said first deflecting member and said second deflecting member.

2. The device according to claim 1, wherein said first prism and said second prism are micro prisms.

3. The device according to claim 1, wherein the optic axis of said second optical member of said first prism and the optic axis of said second optical member of said second prism are jointly electrically controllable such that said first angle and said second angle are substantially equal.

4. The device according to claim 1, wherein said first optical members are polymer based.

5. The device according to claim 1, wherein said second optical members are liquid crystal based.

6. The device according to claim 1, wherein said rotating member further has a second state, said rotating member being configured, when in its second state, to leave the polarization of the beam of light substantially unaffected, wherein said rotating member is electrically switchable between its first and its second state.

7. The device according to claim 6, wherein said rotating member is liquid crystal based.

8. A device comprising a plurality of devices according to claim 6, said plurality of devices being arranged as pixels in a matrix, wherein said pixels are individually controllable.

9. The device according to claim 6, further comprising:
   a telescope for magnifying the beam deflection.

10. The device according to claim 6, further comprising:
   an array of telescopes for magnifying the beam deflection.

11. The device according to claim 9, said telescopes comprising:
   a first lens having focal length $f_1$, and
   a second lens having focal length $f_2$,
wherein $f_1 > f_2$ and the distance between said first lens and said second lens is $f_1 + f_2$.

12. The device according to claim 9, said telescopes comprising:
   a first plurality of lenses having focal length $f_1$ and diameter $D_1$, said first plurality of lenses being arranged in a matrix, and
   a second plurality of lenses having focal length $f_2$ and diameter $D_2$, said second plurality of lenses being arranged in a matrix,
wherein $f_1 > f_2$ and the distance between said first plurality of lenses and said second plurality of lenses is $f_1 + f_2$.

13. The device according to claim 12, said telescopes further comprising:
   a third plurality of lenses having focal length $f_3$ and diameter $D_3$, said third plurality of lenses being arranged in a matrix and located between said first plurality of lenses and said second plurality of lenses at distance $f_1$ from said first plurality of lenses and at distance $f_2$ from said second plurality of lenses,
wherein $1/f_3 = +1/f_2$.

14. The device according to claim 12, further comprising a light source.

* * * * *